United States Patent [19]

Kawamura et al.

[11] Patent Number: 4,526,458
[45] Date of Patent: Jul. 2, 1985

[54] FOCUS CONDITION DETECTING DEVICE FOR CAMERAS

[75] Inventors: Kunio Kawamura, Sakai; Hiromu Mukai, Kawachinagano; Toshihiko Karasaki, Sakai, all of Japan

[73] Assignee: Minolta Camera Kabushiki Kaisha, Osaka, Japan

[21] Appl. No.: 635,422

[22] Filed: Jul. 30, 1984

[30] Foreign Application Priority Data

Aug. 1, 1983 [JP] Japan .................... 58-141720

[51] Int. Cl.³ .................................. G03B 3/00
[52] U.S. Cl. ...................................... 354/406
[58] Field of Search .......... 354/402, 406–408; 250/201 PF, 204

[56] References Cited

U.S. PATENT DOCUMENTS

| | | | |
|---|---|---|---|
| 4,189,218 | 2/1980 | Saito et al. | 354/25 |
| 4,322,616 | 3/1982 | Fukuhara | 250/204 |
| 4,341,953 | 7/1982 | Sakai et al. | 354/406 X |
| 4,359,636 | 11/1982 | Stauffer | 250/204 |
| 4,370,551 | 1/1983 | Fukuhara et al. | 250/201 |
| 4,391,513 | 7/1983 | Fujiki | 354/407 X |
| 4,397,547 | 8/1983 | Grassl | 354/406 X |
| 4,436,395 | 3/1984 | Fukuhara | 354/406 |
| 4,470,682 | 11/1984 | Suzuki et al. | 354/406 |

FOREIGN PATENT DOCUMENTS

| | | | |
|---|---|---|---|
| 52-95221 | 8/1977 | Japan . | |
| 106432 | 8/1980 | Japan | 354/406 |
| 55-157220 | 11/1980 | Japan . | |
| 150808 | 9/1982 | Japan | 354/406 |
| 58-88709 | 5/1983 | Japan . | |
| 58-106511 | 6/1983 | Japan . | |

Primary Examiner—William B. Perkey
Attorney, Agent, or Firm—Joseph W. Price

[57] ABSTRACT

In a focus condition detecting device wherein an object image formed by an objective lens of a camera is re-imaged as first and second images on first and second photocell arrays through a pair of re-imaging lenses, a pair of plano-convex lenses are used as the re-imaging lenses to improve the accuracy of focus condition detection. The device is formed into a module and the plano-convex lenses are formed on a transparent plate supported on a main body of the module. An extremely thin masking member for blocking a part of light rays incident on the plano-convex lenses to form the first and second images is sandwiched between the transparent plate and a surface of the module main body. This arrangement prevents the masking member from rising and/or warping which otherwise causes inconsistency in luminous levels between the first and second images on the first and second photocell arrays. Various examples of the arrangement of the masking member to prevent its rising and/or warping are proposed.

17 Claims, 21 Drawing Figures

FOCUS CONDITION DETECTING DEVICE FOR CAMERAS

BACKGROUND OF THE INVENTION

1. Field of the Invention

The present invention relates to a focus condition detecting device for cameras wherein the object image formed by the camera-objective lens is re-imaged as first and second images on first and second sensors through a pair of re-imaging lenses or relay lenses and the change of the relative positions of the first and second images is detected by the first and second sensors for detecting the focus condition of the camera-objective lens.

2. Description of the Prior Art

Figure 1:
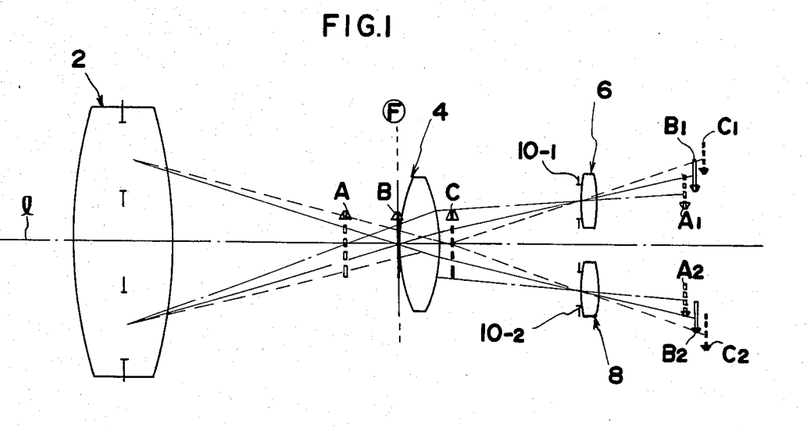
FIG. 1 is a schematic illustration of a typical optical system of known focus condition detecting devices of the type relating to the present invention.

Many focus condition detecting devices for cameras of the type as mentioned above have been proposed, for example, in Japanese Laid-open Patent Application with the laid-open (Tokkaisho) No. 52-95221, and their typical optical system has constructions as shown in FIG. 1. In FIG. 1, a condensor lens 4 is disposed in the vicinity of the predetermined focal plane of camera-objective lens 2 which plane is optically equivalent to the film plane. At the back of the condensor lens 4 a pair of re-imaging lenses 6 and 8 are arranged symmetrically with respect to optical axis 1 (hereinafter referred to as main optical axis) of camera-objective lens 2 so that the image formed by the camera-objective lens on the predetermined focal plane F is re-imaged by means of the pair of re-imaging lenses 6 and 8. The reference characters A, B and C indicate respectively the front focus image, in-focus image and rear focus image formed by camera-objective lens 2.

Re-imaging lenses 6 and 8 form the first and second images of (A1) and (A2), (B1) and (B2), and (C1) and (C2) respectively corresponding to front focus image A, in-focus image B and rear focus image C. When image A, B and C are formed, for example, as the images shown with the upward directed arrow marks, the first and second images corresponding to these images are shown as the images shown by the downward directed arrow marks and the distance between the first and second images varies depending on the focus condition of camera-objective lens 2. Accordingly, if photocell arrays are arranged at or in the vicinity of the position conjugate with predetermined focal plane F with respect to condensor lens 4 and re-imaging lenses 6 and 8 and the change of the relative positions of the first and second images is detected from the outputs of those line photocell arrays, the focus condition of camera-objective lens 2 can be detected.

Note that numerals 10-1 and 10-2 are diaphragm aperture masks installed in front of re-imaging lenses 6 and 8.

In the focus-condition detecting device using the optical system shown in FIG. 1, it is important for the detection of the focus condition of camera objective lens with high accuracty, that the first image coincides with the second image in regard to the luminous level and luminous distribution, and that the distance between the first and second images will not vary depending on the image height, i.e., the position of each point of a target object with respect to main optical axis 1 of camera-objective lens 2.

In the conventional focus condition detecting device using the optical system shown in FIG. 1, however, a pair of biconvex lenses are used as the re-imaging lenses. Since such biconvex lenses are normally molded by different molds and an eccentricity is liable to occur on both spherical surfaces of the lenses, resulting in such disadvantages as an inconsistency in luminous distribution caused by the coma and/or distortion in the first and second images formed by these lenses, and change in the distance between the both images depending on the image height.

Also, when the bicovex lens is used as the re-imaging lenses, the distance between the front principal point of the biconvex lens and a diaphragm aperture mask must be made short, resulting in a substantial reduction in the luminous intensity of the first and second images at the positions distant from the main optical axis, on the first and second line sensors. This will enhance the tendency that the symmetry of the illumination distribution in both images is impaired.

Consequently, if biconvex lenses are used as a pair of re-imaging lenses, a high-precision in the detection of the focus condition of the camera-objective lens can not be expected.

SUMMARY OF THE INVENTION

It is an object of the present invention to provide a focus conditing device of the above described type which has an improved accuracy of focus condition detection.

A focus condition detecting device of the present invention includes a transparent plate on which a pair of re-imaging lenses are formed. The transparent plate is supported on a support member or a module body and provided with first and second flat surfaces perpendicular to the main optical axis of the objective lens of the camera. The first flat surface of the transparent plate faces to an image sensor means having first and second photocell arrays, on which the re-imaging lenses re-image an object image as first and second images, respectively, such that the distance between the corresponding points of the first and second images varies with the focus condition of the objective lens. The re-imaging lenses have a convex surface on the first flat surface of the transparent plate to form a plano-convex lens, respectively. The second flat surface of the transparent plate is used to hold masking means for the re-imaging lenses, i.e., a diaphragm aperture mask in position in co-operation with other member such as the support member as described above or a filter for cutting off light rays of the wave length range undesired for the focus condition detection by the image sensor means, so that the masking means is prevented from rising and/or warping.

The above and other features of the present invention will become more apparent from the following description of the preferred embodiments of the present invention taken in conjunction with the accompanying drawings.

BRIEF DESCRIPTION OF THE DRAWINGS

FIGS. 7a and 7b show ideal luminous intensities on the first and second photocell arrays, wherein FIG. 7a is the case where a uniform illumination distribution is given on predetermined focal plane F and FIG. 7b is the case where a spot image appears on the predetermined focal plane;

FIGS. 9a and 9b show the manner of effective of the diaphragm aperture mask on the light rays arriving at a same image height position of the photocell array through the re-imaging lens, wherein FIG. 9a is the case where a plano-convex lens is used as the re-imaging lens and FIG. 9b is the case where a biconvex lens is used as the re-imaging lens;

DESCRIPTION OF PREFERRED EMBODIMENTS

A preferred embodiment in accordance with the present invention adapted for use in a single reflex camera is described hereinafter with reference to the accompanying drawings.

Figure 2:
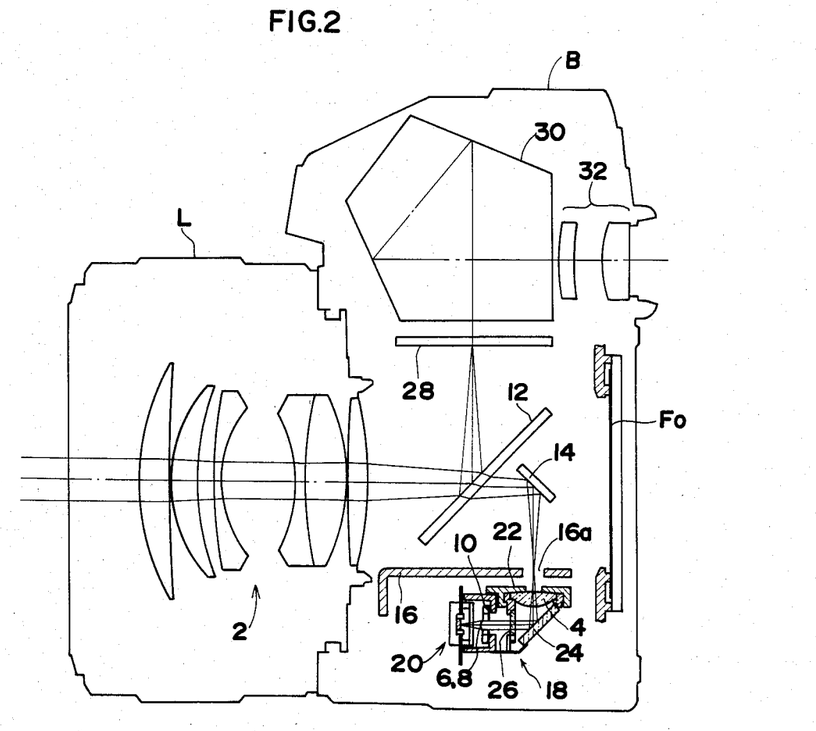
FIG. 2 is a schematic illustration of the overall optical system of a single lens reflex camera in which a focus condition detecting device according to one embodiment of the present invention is employed in the form of a focus condition detecting module.

In FIG. 2, which shows the overall camera optical system of the embodiment, the reference numerals B and L respectively indicate a camera body and an interchangeable lens barrel to be mounted on the camera body. A swingable main mirror 12 has a light-transmitting portion (a transparent portion or a semitransparent portion) through which the light beam passes to sub-mirror 14 obliquely arranged at the back of main mirror 12. The light that has passed through this light transmitting portion will be reflected by sub-mirror 14 in the right down direction. The numeral 16 indicates the bottom wall of the mirror box that houses main mirror 16 and which is formed with an aperture 16a for passing the light beam reflected from sub-mirror 14. Predetermined focal plane F optically equivalent to film plane $F_0$ will be in the vicinity of this aperture 16a.

Focus condition detecting module 18 is located under the bottom wall of mirror box 16. A field aperture mask 22, a light path folding mirror 24 and an infrared cut filter 26 are installed in this main body of module along with a condensor lens 4, re-imaging lenses 6 and 8, photocell package 20 including a CCD (charge-coupled device) array, and diaphragm aperture mask 10.

On the other hand, focusing plate 28, pentagonal roof prism 30, and eyepiece 32, together with main mirror 12, compose a known view-finder optical system of a single lens reflex camera.

Note that sub-mirror 14 is supported by a mirror-supporting frame (not shown) along with main mirror 12. When main mirror 12 has swung up from a view-finder image observation position to a picture-taking position, sub-mirror 14 also rises to a position not to block the picture-taking light beam traveling to the film surface and to cover the light-transmitting portion of main mirror 12.

Figure 3:
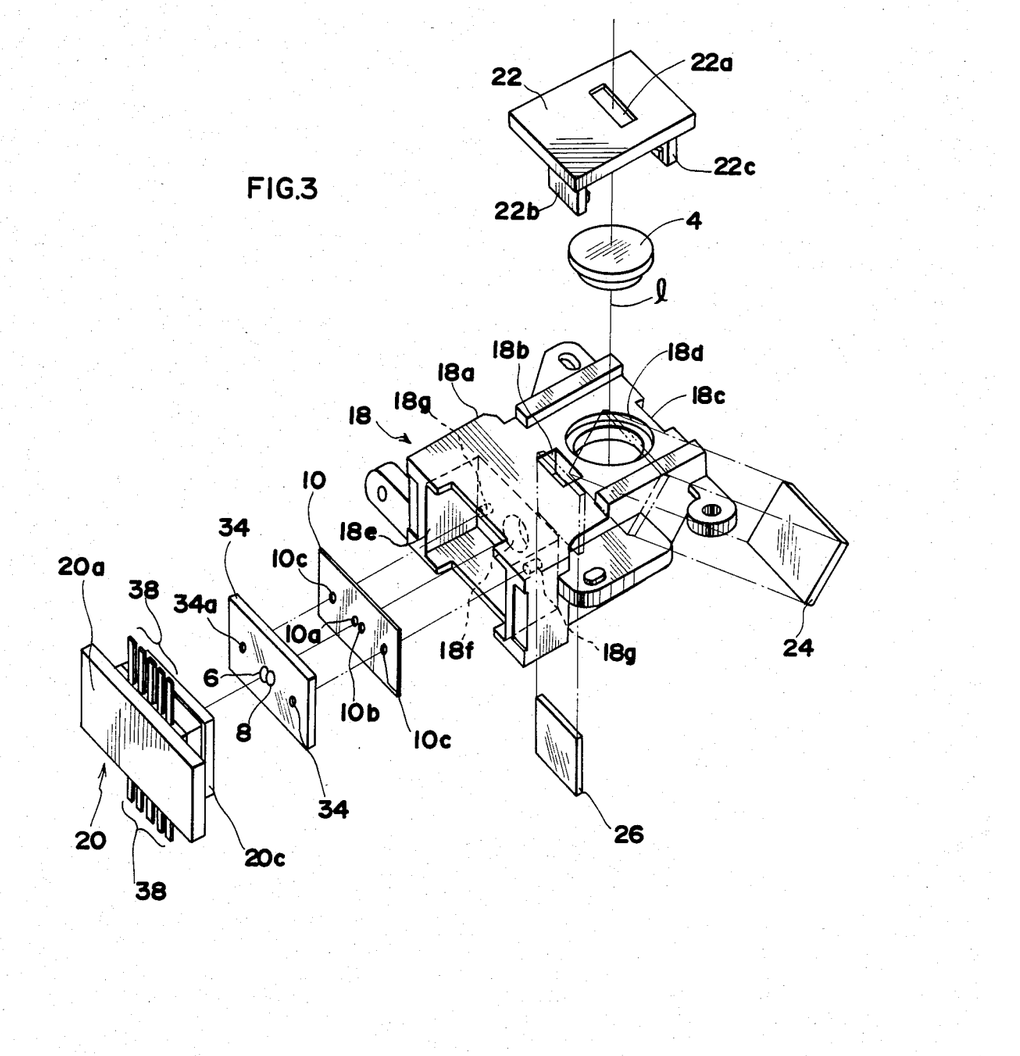
FIGS. 3 to 5 are exploded view, plan view partially in section and longitudinal cross-sectional view of the focus condition detecting module, respectively.
Figure 4:
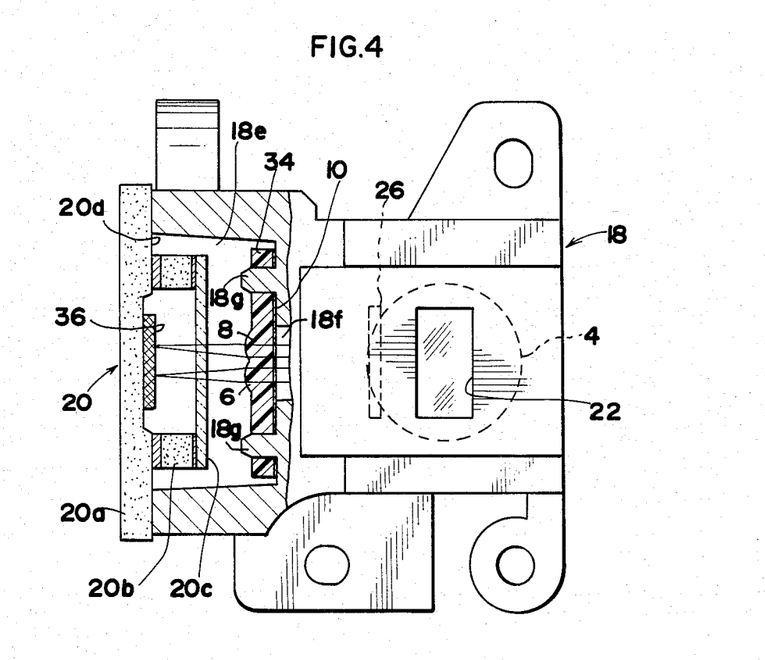
Figure 5:
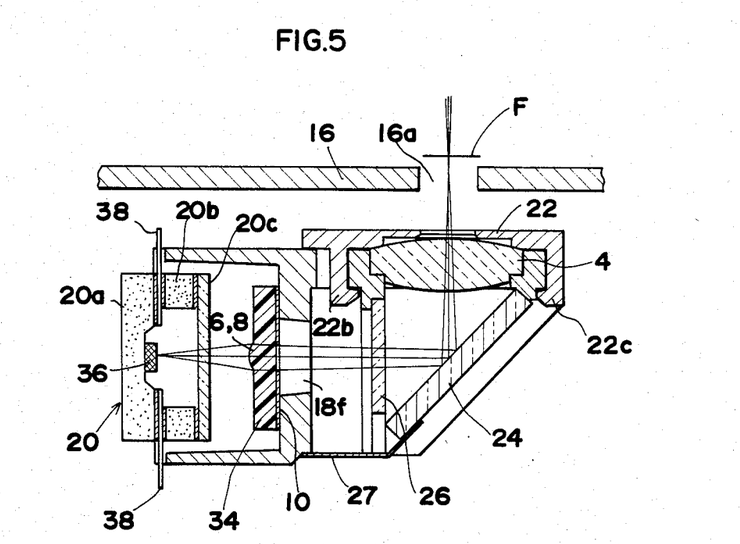

Referring to FIGS. 3 through 5 showing focus detecting module 18, field aperture mask 22 is to define the field of view for the detection of focus condition and has rectangular opening 22a. This field aperture mask 22 has elastic legs 22b and 22c which engage into engaging hole 18b and engaging notch 18c of module main body 18a. The mask also serves as a condensor lens retaining means that retains condensor lens 4 in opening 18d of module main body 18a. Note that although field aperture mask 22 is under the bottom wall 16 of the mirror box and is positioned optically behind predetermined focal plane F, mask 22 may as well be fixed to bottom wall 16 of the mirror box to be on predetermined focal-plane F.

Light path folding mirror 24 is fixed to module main body 18a by means of bonding material or cement at an angle of 45° with respect to main optical axis l folded by sub-mirror 14. The light beam reflected by sub-mirror 14 has passes through the rectangular opening of field aperture mask 22 and condensor lens 4 and is then reflected by light path folding mirror 24 toward the front of the camera. Infrared cut filter 26 serves to cut the light in the wavelength range of infrared that forms an image at a further position as compared with the light in the wave-length range of visible light. The CCD array has a sensitivity also in the infrared wavelength range. Therefore the light in the infrared wavelength range is undesired for the focus condition detection and must be cut off.

Filter 26 may be inserted from the under side of module main body 18a and fixed in the front of light path folding mirror 24 (optically in the rear of light path folding mirror 24) of module main body 18a by means of bonding. Light shielding plate 27 is fixed to module main body 18a after filter 26 has been mounted.

Transparent plate 34 is made of transparent plastic material and has first and second flat surfaces perpendicular to the main optical axis l folded by light path folding mirror 24. Re-imaging lenses 6 and 8 are formed on this transparent plate 34 as plano-convex lenses with their convex spherical surface located on the first flat surface facing to photo sensor package 20 (optically rear side). The main optical axis l folded by light path folding mirror 24 passes the center between re-imaging lenses 6 and 8. In the case of this embodiment, re-imaging lenses 6 and 8 are formed such that they partially overlap each other, but they may as well be formed separately.

Diaphragm aperture mask 10 with a pair of openings 10a and 10b respectively opposing re-imaging lenses 6 and 8 is made up of this plate with a thickness of approximately 30μ–60μ and is sandwitched between module main body 18a and the second flat surface of transparent plate 34 to be held on module main body 18a. Namely, module main body 18a is formed with a rectangular opening 18e with the bottom being flat. Diaphragm aperture mask 10 and transparent plate 34 are inserted into this rectangular opening one after another. Diaphragm aperture mask 10 is in contact with both the flat bottom wall of the rectangular opening and the flat surface of transparent plate 34 and sandwitched therebetween. Note that a through hole 18f concentric with main optical axis 1 is formed on the bottom wall of rectangular opening 18e, and that a pair of pins 18g are also carried on this bottom wall. These pins may be received by holes 10c and 34a formed on aperture mask 10 and transparent plate 34, respectively, for positioning diaphragm aperture mask 10 and transparent plate 34 in the plane perpendicular to main optical axis 1. Note further that transparent plate 34 may be fixed to the bottom wall of the rectangular opening by means of bonding or heat caulking.

Photo sensor package 20 includes CCD array chips 36 arranged in a row on baseplate 20 and enclosed by baseplate 20, spacer 20b and cover glass 20c. Output terminals 38 of the CCD array are tapped from the package. Surface 20d of baseplate 20a is formed as a reference standard engaging plane, and the end plane of rectangular opening 18e of module main body 18a is brought into contact with the standard plane. With such construction, the positions of transparent plate 34, diaphragm aperture mask 10, filter 26, mirror 24, condensor lens 4 and view-field restriction mask 22 mounted on module main body 18a are set with reference to the standard engaging plane 20d of baseplate 20a with respect to the direction along main optical axis 1. Thus the positions of these optical members relative to CCD array 36 in that direction may be readily determined on assembly thereof. Although CCD array 36 is arranged in a row to extend in the direction perpendicular to the optical axis 1 folded by light path folding mirror 24, a given number of cells of the CCD array are used as the first line sensor 36a for detecting the first image formed by re-imaging lens 6 while another given number of cells of the CCD array are used as the second line sensor 36b for detecting the second image formed by re-imaging lens 8 (FIGS. 7a and 7b).

Figure 6:
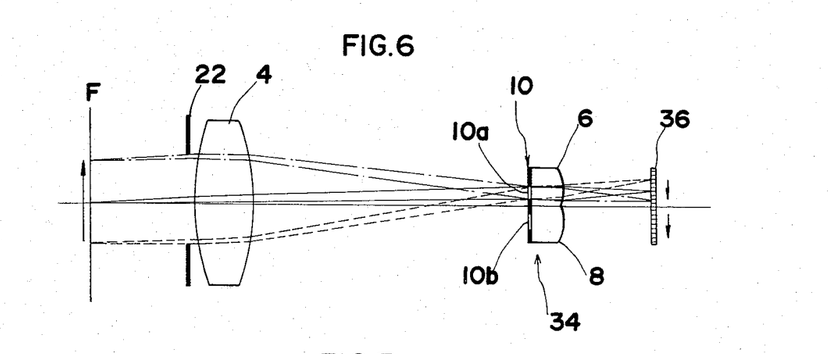
FIG. 6 is a schematic illustration of the development of the optical system of the focus condition detecting module.

FIG. 6 is schematic illustration of the development of the optical system in the focus condition detecting module 18, showing the state that the image formed on predetermined focal plane F by camera-objective lens 2 are reformed as the first and second images on CCD array 36. Diaphragm aperture mask 10 blocks the light beam that forms the first and second images on CCD array 36, at both far and near sides substantially symmetrically with respect to main optical axis 1, to thereby prevent an inconsistency in illumination distribution on the first and second images which may otherwise occurs with the change in diameter of the pupil of camera-objective lens 2 by the objective lens diaphragm and simultaneously to eliminate the influence on the first and second images given by the portions of re-imaging lenses 6 and 8 that are close to main optical axis 1.

Figure 7A:
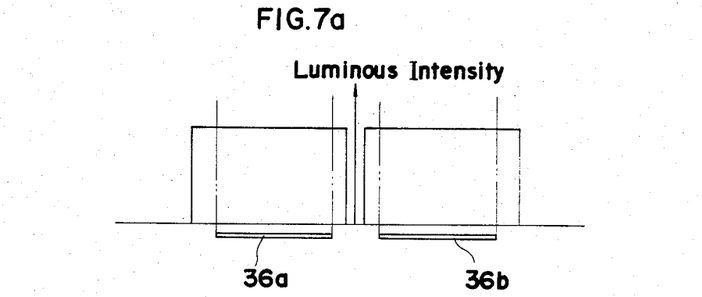

In the case of focus-condition detecting device employing the basic optical system as illustrated in FIG. 1, if uniform illumination distribution is given on predetermined focal plane F about the position where the height of image is zero, the luminous intensity of the first and second images on the photosensitive surfaces of the first and second photocell arrays 36a and 36b will ideally be completely uniform as shown in FIG. 7a, and the level and distribution of the illumination of both images coincide with each other. Also when a black spot image exists in the uniform illumination distribution on predetermined focal plane F, luminous intensities of the first and second image on the photosensitive surface of the first and second line sensors 36a and 36b will be as illustrated in FIG. 7b.

Figure 7B:
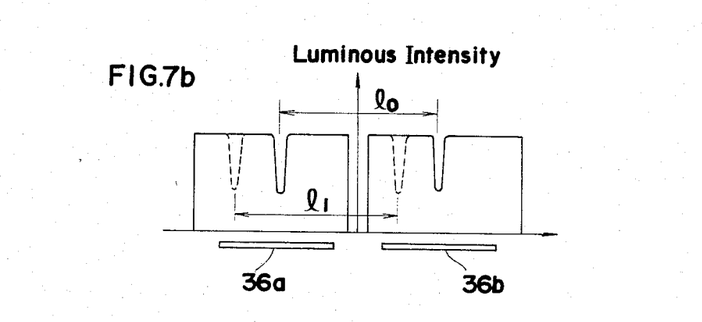

In FIG. 7b, the solid lines show the luminous intensities of the first and second images when the above black spot image appears at the position where the height of the image is zero, and the broken lines show the luminous intensities when the black spot image appears at the position of a given image height. Ideally, the distance between the two spot images on the first and second photo sensor arrays will not change depending on the height of the spot images ($l_1 = l_0$).

Figure 8:
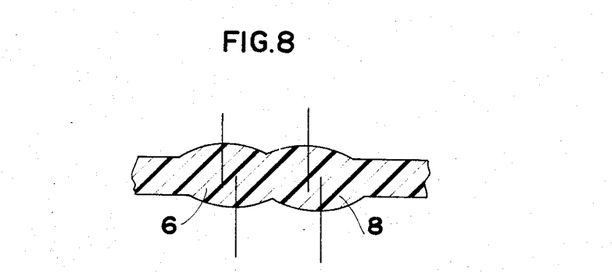
FIG. 8 is a cross-sectional view of biconvex re-imaging lenses, showing the manner of eccentricity of the front and rear convex surfaces of the lenses.

In the case re-imaging lenses 6 and 8 are composed of biconvex lenses as in conventional device, if an eccentricity arises between convex surfaces of the biconvex lens as shown in FIG. 8 due to positional discrepancy between the molds for forming the front and rear surfaces of the lenses, a coma and distortion produced by both lenses may increase and at the same time the degree of this coma and distortion may vary with the lenses. This will cause the illumination distribution in the first and second images to inconsistent at each height in the image at focal plane F, and the distance between the first and second images may also vary depending on the height in the image at focal plane F.

In contrast, when re-imaging lenses 6 and 8 are composed plano-convex lenses as in the above described embodiment, the problem of eccentricity occurring in connection with the biconvex lens will not occur even if a discrepancy occurs in the position of the molds for forming the front and rear surfaces of the re-imaging lenses. Consequently, even if a little coma and distortion arise in the first and second images because of the eccentricity of plano convex lenses from main optical axis 1, the degree of this coma and distortion will not differ with the lenses. This would easily afford consistency of the luminous distributions of the first and second images and cause little change in the distance between corresponding points in the first and second images dependent on the height of the image at focal plane F. Thus the accuracy of detecting the focus-condition will be improved.

Figure 9A:
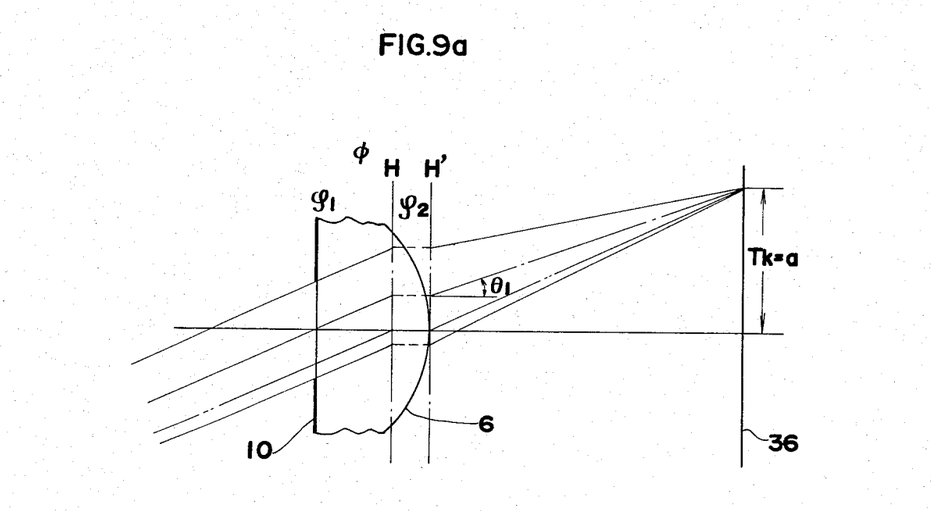
Figure 9B:
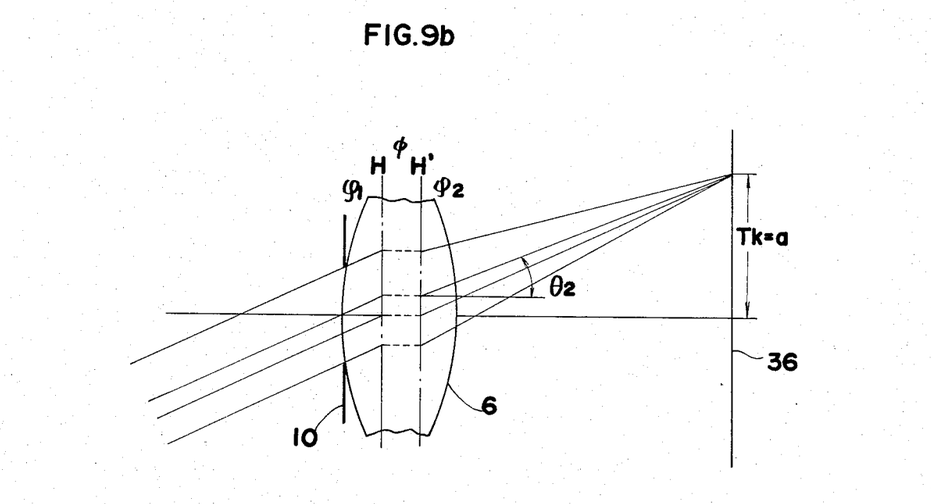

Additionally when the plano convex lenses are used as re-imaging lenses 6 and 8, the decrease of illumination at the portions of the first and second images distant from main optical axis 1 will be less as compared with the case of biconvex lenses. FIGS. 9a and 9b illustrate ray tracing in the cases where the biconvex lens and plano convex lens are employed, respectively. In both cases, diaphragm aperture mask 10 is arranged in contact with the re-imaging lenses. It is assumed here that the refractive powers of the re-imaging lenses shown are equal to each other.

In the case of plano-convex lens, the refractive power $\psi 1$ at the flat surface is zero, and the refractive power $\psi 2$ at the convex surface is $\psi$. Also, in the case of biconvex lens, refractive power $\psi 1$ and $\psi 2$ at both convex surfaces are approximately $\psi/2$, respectively. The reference characters H and H' dinote the front principal plane and rear principal plane of the re-imaging lens, respectively. As illustrated in FIGS. 9a and 9b, when the light rays restricted by diaphragm aperture mask 10 fall on the re-imaging lens at the equal angle of incidence, the light ray passing through the center of the aperture of the diaphragm aperture mask will emanates from the lens and reaches the point on line sensor 36a where the image height Tk equals a with the exit angle being $\theta_1$ and $\theta_2$, respectively. According to the principal of fourth power of cosine, the luminous intensity E at the height of the image Tk=a on photocell array 36a can be expressed as $E = E_o \cos^4 \theta$ wherein Eo represents the luminous intensity at the point of the image height of 0. Because of $\theta_1 < \theta_2$ the luminous intensity in the case of the re-imaging lens composed of the biconvex lens may become lower than in the case of the plano-convex lens.

In other words, the luminous intensity at a position distant from main optical axis 1 may be reduced, and this may occur with the pair of re-imaging lenses 6 and 8, symmetrically with respect to main optical axis 1. This may result in an inconsistency between the first and second images formed by the above re-imaging lenses, and reduces the accuracy of focus detection. This tendency is aggravated when the biconvex lenses are used as the re-imaging lenses, but it will be improved when the plano-convex lenses are used as the re-imaging lenses. This is because when diaphragm aperture mask 10 is positioned adjacent to the re-imaging lens, mask 10 will be more distant from the principal point of the lens in the case of the plano-convex lens than in the case of biconvex lens. If diaphragm aperture mask 10 is arranged further away from the front convex surface in the case of the biconvex lens, this tendency will be reduced. However, when the diaphragm aperture mask is arranged in this manner, positional discrepancy between the mask and biconvex lens as the re-imaging lens is likely to occur, and also warp or bending of mask plate will be liable to occur. This may lead to an inconsistency in the luminous levels between the first and second images, resulting in difficulty in the improving the accuracy of the focus detection.

Note that as described above, because of the extreme thinness of diaphragm aperture mask 10, this mask may easily rise and warp. Thus now to support the mask is important to improve the accuracy of the focus detection. From this point of view, in this embodiment diaphragm aperture mask 10 is sandwitched between on one hand the flat surface of transparent plate 34 forming the plano convex lenses, i.e. re-imaging lenses 6 and 8, and on the other hand the flat bottom of rectangular opening 18e of module body 18a so that there is no possibility of rising and warping of diaphragm aperture mask 10.

Note that as described previously, in the above embodiment, the surface 20d of baseplate 20a of the photo sensor package is formed as the reference standard engaging plane and the end plane of rectangular opening 18e of module main body 18a is brought into contact with the standard engaging plane, so that the positions of transparent plate 34, diaphragm aperture mask 10, filter 26, mirror 24, condenser lens 4 and field aperture mask 22 installed in module main body 18a along main optical axis 1 with respect to CCD array 36 will be readily determined upon assembling. Consequently, these optical members can be easily positioned along main optical axis 1, and the degree of parallelness of each optical member to the other and the degree of precision of the distance between these optical members can be improved.

This may eliminate, in the stage of assembling focus condition detecting module 18, the possibility of the inconsistency that may otherwise occur in the luminous level and luminous distribution of the first and second images on the first and second photo sensors 36a and 36b. Thus the number of processes in manufacturing the focus condition detecting module 18 can be reduced, resulting in reduction of cost.

FIGS. 10a, 10b, 10c and 10d show other examples of the arrangement of diaphragm aperture mask 10 that prevents rising and warping of the mask.

Figure 10A:
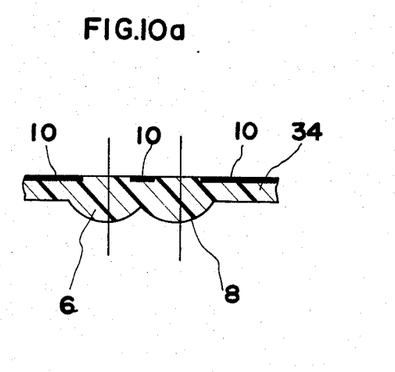
FIGS. 10a, 10b, 10c and 10d are cross-sectional views of modified diaphragm aperture masks adapted to be brought into close contact with the plano-convex re-imaging lenses.

In FIG. 10a, depressions corresponding to the shape of aperture mask 10 are formed on the flat surface of transparent plate 34 which is formed with re-imaging lenses 6 and 8 such that diaphragm aperture mask 10 is formed by pouring a melted opaque synthetic resin into this depressions and hardened. Namely, this is an example in which a diaphragm aperture mask 10 is embedded in transparent plate 34.

Figure 10B:
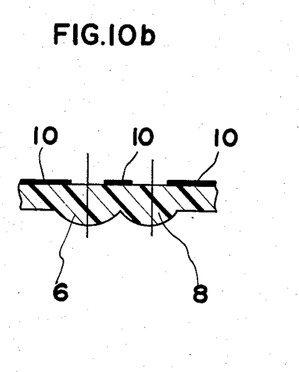

In FIG. 10b, the diaphragm aperture mask 10 is formed on the flat surface of the transparent plate 34 by evaporation or printing of an opaque material.

Figure 10C:
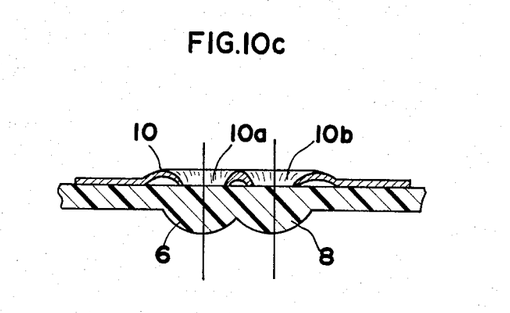

In FIG. 10c, the diaphragm aperture mask 10 is made of thin elastic opaque plate and is bent so that it has elasticy itself that permit the peripheral of openings 10a and 10b to be in close contact with the flat surface of transparent plate 34. In this case, the diaphragm aperture mask 10 may be supported on the transparent plate 34 or on module main body 18a by suitable means.

Figure 10D:
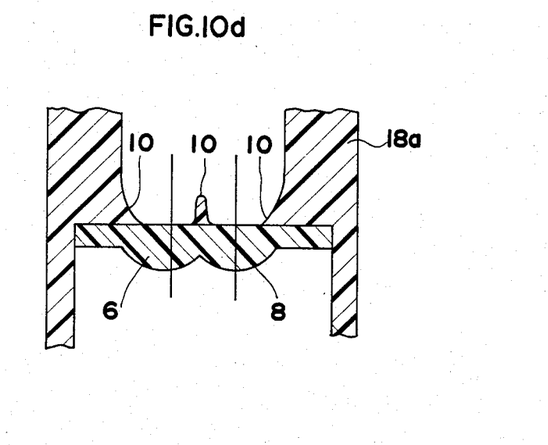

In FIG. 10d, the diaphragm aperture mask 10 is formed of an opaque synthetic resin as an integral part of module main body 18a.

Figure 11:
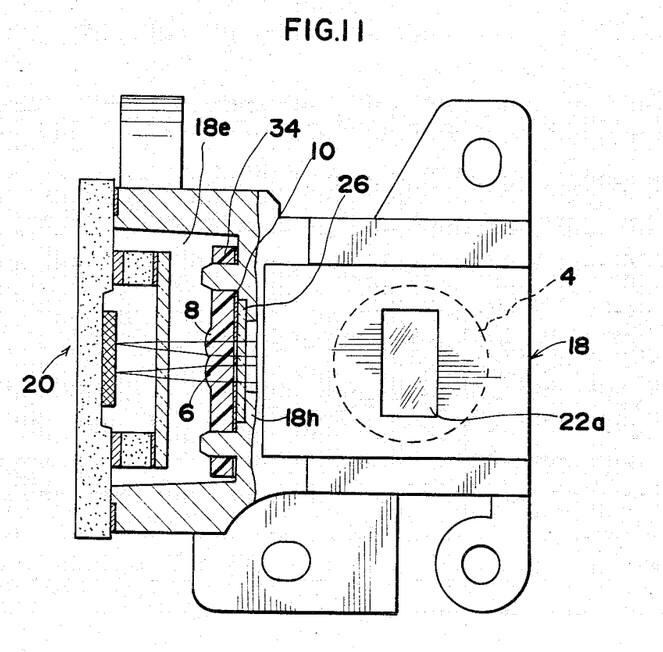
FIGS. 11 and 12 are plan view partially in section and longitudinal cross-sectional view of a focus condition detecting device according to another embodiment of the present invention, which is formed into a focus condition detecting module, respectively.
Figure 12:
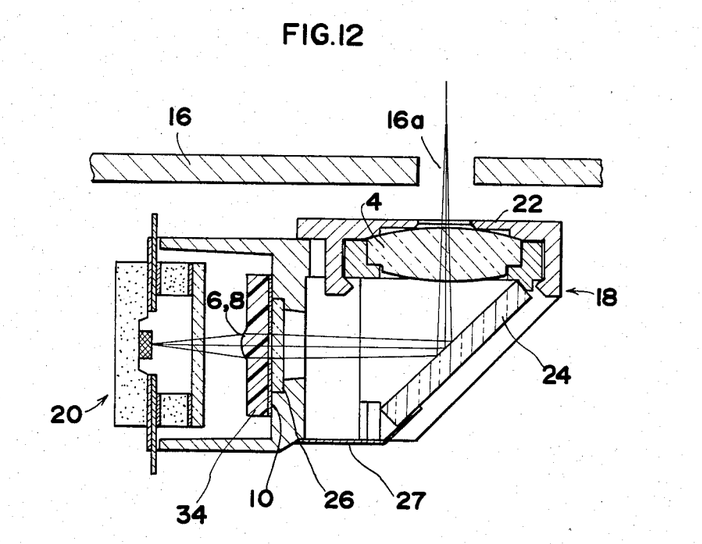

Further, FIGS. 11 and 12 show another embodiment of this invention wherein infrared cut filter 26 being required is arranged in front of transparent plate 34 and the diaphragm aperture mask 10 is sandwitched between the filter and plate. In this embodiment, an additional depression 18h is formed around through hole 18f on the bottom wall of rectangular opening 18l of module main body 18a, and infrared cut filter 26 is accommodated in this depression with transparent plate 34 being arranged to urge diaphragm aperture mask 10 to filter 26. In this case, filter 26, diaphragm aperture mask 10 and transparent plate 34 are fixed to module main body 18a by bonding.

In the embodiment illustrated in FIGS. 11 and 12, the rising and warping of diaphragm aperture mask 10 can be prevented likely in the mask arrangement of the above first embodiment and those in FIGS. 10a, 10b, 10c and 10d. This mask arrangement is free from the problems of the deterioration of illumination distribution of the first and second images formed on the first and second photo sensor arrays at the position distant from main optical axis 1 and the problem of an inconsistency of luminous levels between the first and second images. Another advantage of this arrangement is a low cost resulting from the use of a small-sized infrared cut filter 26.

Figure 13:
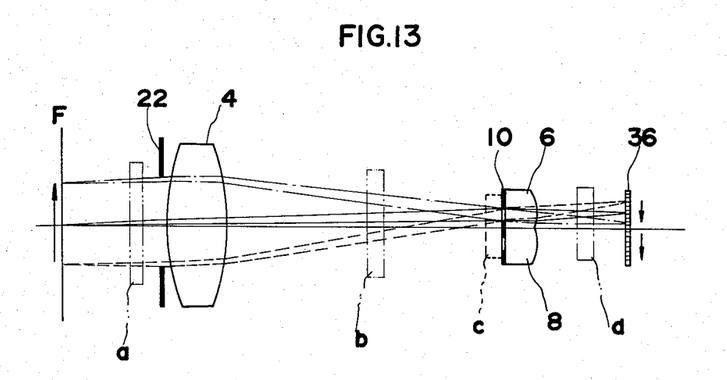
FIG. 13 is the same illustration as FIG. 16, showing by two dotted lines various positions where the infrared light cut filter may be located.

Generally, infrared cut filter is expensive, and as the size becomes smaller, the cost is less. As shown in FIG. 13, the cross-sectional area of the light beam forming the first and second images is minimum at position c immediately before diaphragm aperture mask 10. Consequently, the size of infrared cut filter 26 will be the smallest in the case of the embodiment of FIGS. 11 and 12, as compared with the cases where the filter is installed at positions a, b or d. This may also result in a smaller space taken by this infrared cut filter 26, leaving some extra space for other purposes. Further, when it is attempted to install this infrared cut filter 26 at position d between re-imaging lenses 6 and 8 and CCD array 36, a change in the thickness of the filter plate may directly result in the change in the positions of the first and second images. If this filter is installed at position c, however, only minor change may occur in the positions of the first and second images due to the change in the filter plate thickness. Also, if the filter is located at position a, the filter is to be installed outside of module main body 18a, causing dust to attach on the filter surface. As shown in FIGS. 11 and 12, since this filter is sealed inside module main body 18a when it is installed at the position c, there will be no possibility of dust adhesion on it.

Note that a cover glass for a photo sensor package is made of an infrared cut filter material is disclosed in Japanese Laid-open Patent Application with a laid-open number (Tokukaisho) No. 58-106511 (1984). As to the photo sensor package, however, it is common in enclosing CCD array chips to make the heat deposition of the cover glass by using a low-degree melting glass. Because the cover glass is heated, the use of an infrared cut filter as a cover glass may cause the spectral transmissivity of the filter to change.

Figure 14A:
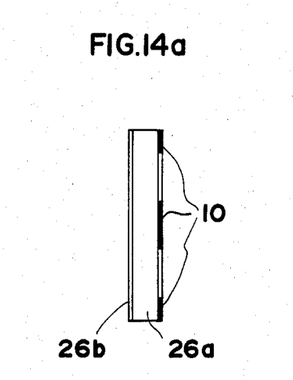
FIGS. 14a and 14b are cross-sectional view and plan view of a modified diaphragm aperture mask directly formed on the infrared light cut filter, respectively.
Figure 14B:
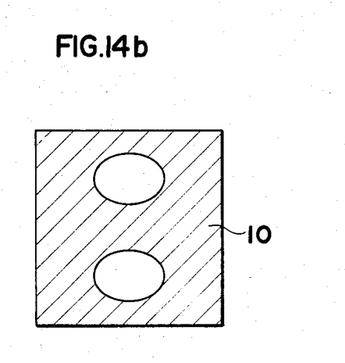
Figure 14C:
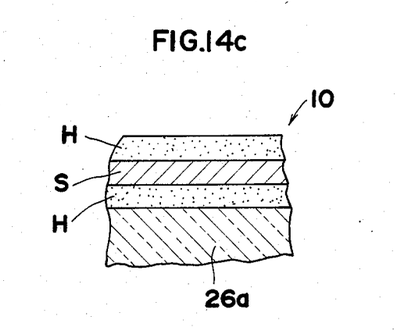
FIG. 14c is an enlarged cross-sectional view of the modified diaphragm aperture mask.

FIGS. 14a, 14b and 14c show an embodiment wherein diaphragm aperture mask 10 is formed on infrared cut filter 26 to prevent the rising and warping of the mask. Because infrared cut filter 26 generally made by forming on galss baseplate or glass substrate 26a multilayers 26b while a heat absorbing filter may be used as the infrared cut filter, the evaporation for forming diaphragm aperture mask 10 will be made more easily than in the case where transparent plate 34 is made of a transparent resins material. When diaphragm aperture mask 10 is formed by the evaporation on glass substrate 26a of filter 26, either aluminum Al or chrome Cr is used as the material for the evaporation. At this time, in order to minimize the light reflection at diaphragm aperture mask 10 (to make the mask appear black), as shown in FIG. 14c, a layer H of a dielectric material with a high-refractive index, such as TiO2, ZrO2 and ZnS may be formed by evaporation on both sides of aluminum or chrome layers. Note that the diaphragm aperture mask may be formed by printing a black film on glass substrate 26a of filter 26.

This invention has been described in detail with particular reference to the preferred embodiments thereof, but it should be understood that the application of this invention is not limited to the above embodiments.

For example, although condenser lens 4 is provided to restrain or supress the divergence of the light rays that has passed through predetermined focal plane F of camera-objective lens 2, the detection of focus condtion is basically possible even if this lens 4 is omitted. Similarly, infrared cut filter 26 may be dispensed with the first and second photo sensor arrays 36a and 36b have no sensitivity to the infrared rays. When the camera has a sufficient space in the vertical direction thereof in or under the lower part of the mirror box, light pass folding mirror 24 can also be omitted affording a longitudinal series arrangement of a filter 26, a diaphragm aperture mask 10, a transparent plate 34 and photo sensor package 20.

Further, the shapes of diaphragm aperture mask 10 and field aperture mask 20 shown in the embodiments are only examples of many variations, and these shapes may be changed as required. Although the plano-convex lenses as the pair of re-imaging lenses 6 and 8 are formed on a single transparent plate in the above embodiments, these re-imaging lenses may also be formed separately.

Further, in place of employing infrared cut filter 26, a mirror that transmits infrared rays and reflects visible light may be employed as the light path folding mirror 24 for performing the same function as the filter.

As described above, in the focus detecting device according to the present invention, a pair of plano-convex lenses are used as the pair of re-imaging lenses in place of biconvex lenses. This will eliminate the problem of eccentricity of the spherical surfaces of both re-imaging lenses and minimize the inconsistency of degrees of luminous levels and luminous intensity distributions of the first and second images formed on the first and second photo sensor arrays.

At the same time, the device may be free from the disadvantage of change in the distance between the first and second images with the height of the image at the focal plane, thereby affording a highly accurate focus detection. Additionally, even if the diaphragm aperture mask is arranged in close contact with the flat surface of the plano-convex lenses, it may result in less reduction in the illumination distributions of the first and second images at the positions distant from the main optical axis, permitting precise focus detection.

Note that if the plano-convex lenses as the pair of re-imaging lenses are formed on a single transparent plate as in the above embodiments, it will be free from the problem of inconsistency in the luminous intensities between the first and second images due to deviation of the relative positions of the plano-convex lenses.

Also, if the diaphragm aperture mask is sandwitched between the flat surfaces of the module main body or the infrared cut filter and the flat surface of the transparent plate, such construction may prevent the diaphragm aperture mask from rising or warping, eliminating an inconsistency in the luminous levels of the first and second images due to the rising or warping of the mask.

What is claimed is:

1. A focus condition detecting device for a camera having an objective lens which forms an object image, said device comprising:

image sensor means which has first and second photocell arrays extending in the direction perpendicular to the main optical axis of said objective lens and arranged opposite to one another with respect to the main optical axis of said objective lens;

a transparent plate having first and second flat surfaces perpendicular to the main optical axis of said objective lens and arranged to face said first flat surface to said image sensor means;

a pair of re-imaging lenses formed on said transparent plate to re-image said object image as first and second images on said first and second photocell arrays respectively so that the distance between the corresponding points of said first and second images on said first and second photocell arrays varies with the focus condition of said objective lens, each said re-imaging lens having a convex surface on said first flat surface of said transparent plate to form a plano-convex lens;

a support member for supporting at least said transparent plate; and masking means having a pair of openings and blocking a part of light rays incident on said re-imaging lenses to form said first and second images, in a symmetrical manner with respect to the main optical axis of said objective lens, said masking means being sandwiched between said second flat surface of said transparent plate and said support member with said openings aligned with said re-imaging lenses.

2. A focus condition detecting device as defined in claim 1, wherein said support member includes a flat surface perpendicular to the optical axis of said objective lens and said masking means is sandwiched between said second flat surface of said transparent plate and said flat surface of said support member.

3. A focus condition detecting device as defined in claim 2, further comprising a condenser lens arranged optically in front of said masking means to co-operate with said re-imaging lenses for the formation of said first and second images and fixedly supported on said support member.

4. A focus condition detecting device as defined in claim 3, further comprising another masking means having a field aperture and restricitng the field of view viewed from said image sensor means through said re-imaging lenses and said condenser lens, said masking means having said field aperture being supported on said support member.

5. A focus condition detecting device as defined in claim 4, further comprising a package fixedly incorporating said image sensor therein and having a surface as a reference standard engaging plane, wherein said support member is brought into contact with said surface of said package so that the positions of said re-imaging lenses on said transparent plate, said two masking means and said condenser lens with respect to said image sensor means are readily determined.

6. A focus condition detecting device as defined in claim 5, wherein said support member and said package together constitute a focus condition detecting module to be mounted on said camera.

7. A focus condition detecting device as defined in claim 6, wherein said camera is a single lens reflex camera which includes a swingable mirror swingable between an image viewing position and a picture taking position and having a light transmission portion permitting transmission of light rays, said device further comprising a sub-mirror arranged optically behind said swingable mirror for reflecting the light rays having passed through said objective lens and said light transmission portion of said swingable mirror towards said condenser lens when said swingable mirror is at the image viewing position.

8. A focus condition detecting device as defined in claim 7, wherein said module is disposed at a lower portion of said camera, and further comprising a light path folding mirror supported on said support member at a position optically behind said condenser lens for folding or bending the path of the light rays having passed through said condenser lens towards the front of said camera such that said image sensor means, said re-imaging means and said masking means having said pair of openings align with one another in the horizontal direction.

9. A focus condition detecting module for use in a camera which includes a camera objective lens for forming an object image, said module comprising:
a module body to be mounted on said camera;
image sensor means attached on said module body and having first and second photocell arrays extending in one direction;
a transparent plate having first and second flat surfaces and supported on said module body with said first and second flat surfaces being parallel to the direction in which said first and second photocell arrays extend, said first flat surface facing to said image sensor means;
a pair of re-imaging lenses formed on said transparent plate and having a convex surface on said first flat surface to form a plano-convex lens, respectively, said re-imaging lenses re-imaging said object images as first and second images on said first and second photocell arrays with said module body mounted on said camera so that the distance between the corresponding points of said first and second images on said first and second photocell arrays varies with the focus condition of said objective lens; and
masking means having a pair of openings and sandwiched between said second flat surface of said transparent plate and said module body with said openings aligned with said re-imaging lenses, said masking means blocking a part of light rays incident on said re-imaging lenses to form said first and second images, in a symmetrical manner with respect to the center between said re-imaging lenses.

10. A focus condition detecting module as defined in claim 9, further comprising a condenser lens supported on said module body and arranged optically in front of said masking means to co-operate with said re-imaging lenses for the formation of said first and second images.

11. A focus condition detecting module as defined in claim 10, further comprising another masking means having a field aperture and supported on said module body at a position optically in front of said condenser lens for restricting the field of view viewed from said image sensor means through said re-imaging lenses and said condenser lens.

12. A focus condition detecting device as defined in claim 11, further comprising a light path folding mirror supported on said module body, wherein said condenser lens is suported at an upper portion of said module body so that its optical axis extends vertically and said optical axis folding mirror is supported at a lower portion of said module body and inclined to fold the optical axis towards the horizontal direction, said first and second flat surfaces of said transparent plate being perpendicular to the optical axis folded by said optical axis folding mirror.

13. A focus condition detecting module as defined in claim 12, further comprising a filter supported on said module body and arranged to cut off the light rays of the wave-length range undesired for the focus condition detection by said image sensor means.

14. A focus condition detecting module as defined in claim 9, further comprising a package incorporating said image sensor means therein and having a surface as a reference standard engaging plane on which said module body is brought into close contact.

15. A focus condition detecting module as defined in claim 9, wherein said module body includes position restricting means for restricting the positions of said transparent plate and said masking means in a plane parallel to the direction in which said first and second photocell arrays extend.

16. A focus condition detecting module as defined in claim 15, wherein said transparent plate and said masking means include a pair of holes, respectively, and said position restriction means includes a pair of projections engaging said holes of said transparent plate and said masking means, respectively.

17. A focus condition detecting device for a camera having an objective lens which forms an object image, said device comprising:

image sensor means which has first and second photocell arrays extending in the direction perpendicular to the main optical axis of said objective lens and arranged opposite to one another with respect to the main optical axis of said objective lens;

a transparent plate having first and second flat surfaces perpendicular to the main optical axis of said objective lens and arranged to face said first flat surface to said image sensor means;

a pair of re-imaging lenses formed on said transparent plate to re-image said object image as first and second images on said first and second photocell arrays respectively so that the distance between the corresponding points of said first and second images on said first and second photocell arrays varies with the focus condition of said objective lens, each said re-imaging lens having a convex surface on said first flat surface of said transparent plate to form a plano-convex lens;

a filter for cutting off light rays of the wave-length undesired for the focus condition detection by said image sensor means;

a support member for supporting at least said transparent plate and said filter; and masking means having a pair of openings and blocking a part of light rays incident on said re-imaging lenses to form said first and second images, in a symmetrical manner with respect to the main optical axis of said objective lens, said masking means being sandwiched between said second flat surface of said transparent plate and said filter with said openings aligned with said re-imaging lenses.

* * * * *